Nov. 25, 1969    W. L. ZEMBERRY    3,479,743
DEPTH-MEASURING GAUGE
Filed April 18, 1967
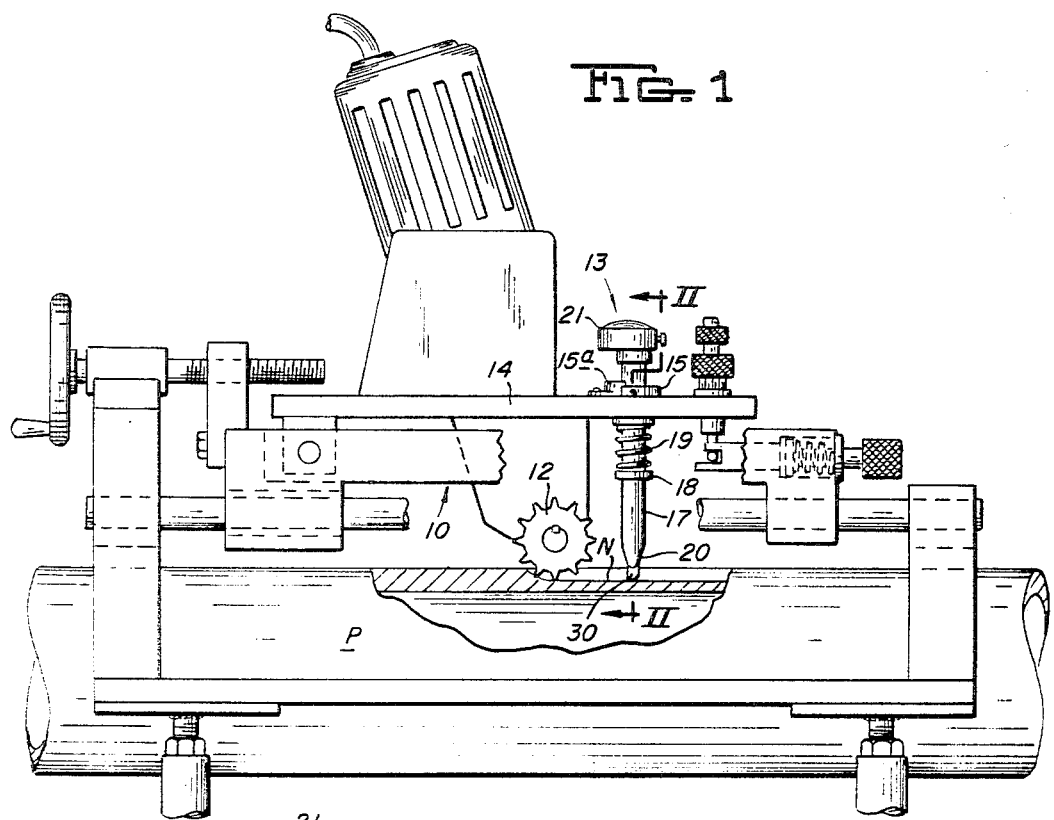
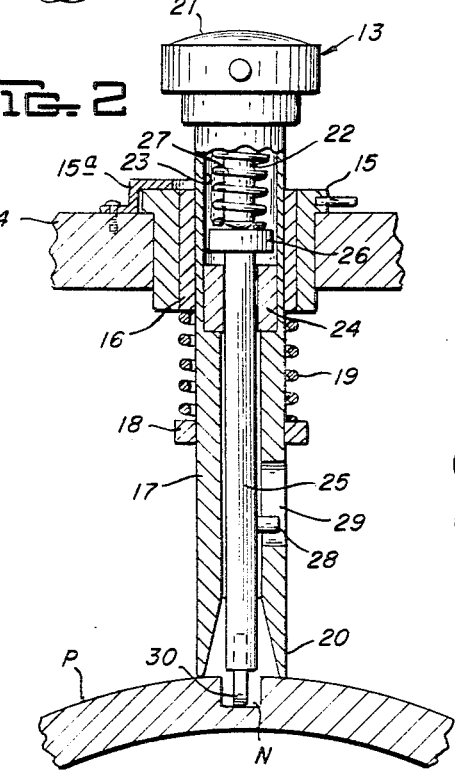
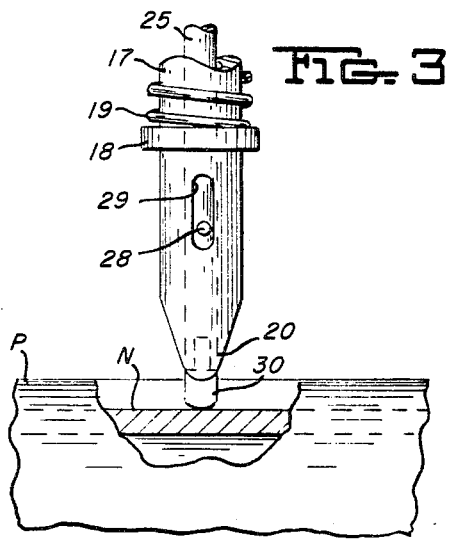
INVENTOR
WILLIAM L. ZEMBERRY
By Donald G. Dalton
Attorney

United States Patent Office 3,479,743
Patented Nov. 25, 1969

3,479,743
DEPTH-MEASURING GAUGE
William L. Zemberry, Swissvale Borough, Pa., assignor to United States Steel Corporation, a corporation of Delaware
Filed Apr. 18, 1967, Ser. No. 631,807
Int. Cl. G01b *3/22, 5/00;* G03b *1/64*
U.S. Cl. 33—169                    2 Claims

---

ABSTRACT OF THE DISCLOSURE

A gauge for measuring the depth of a notch as it is cut in the surface of a workpiece. Gauge includes an anvil which rides on the surface of the workpiece and moves up and down with irregularities in the surface. A spade mounted within the anvil rides within the notch and gives an indication of the depth on a dial indicator.

---

This invention relates to an improved gauge for measuring the depth of a notch in the surface of a workpiece.

Although my invention is not thus limited, the gauge is particularly useful for measuring the depth of simulated flaws in standard specimens which are used to calibrate flaw-detection equipment. Certain types of metal products are inspected for internal discontinuities by ultrasonic, eddy-current, fringe-flux or analogous systems. Before actually inspecting the product, the inspector must adjust the test equipment to the desired sensitivity, using standard specimens which contain simulated flaws of known dimensions. My earlier co-pending application Ser. No. 506,097, filed Nov. 2, 1965, now Patent No. 3,354,784, shows a portable milling machine which cuts simulated flaws for this purpose. The gauge of the present invention can be applied advantageously to the milling machine shown in my earlier application to measure the depth of cut. The machine has a micrometer mechanism which indicates how far the cutting tool feeds, but this is not a true measurement of the depth, since the tool wears as it cuts. Nevertheless it is apparent the present invention may be useful elsewhere.

An object of the invention is to provide a depth-measuring gauge of simple construction readily applied to a milling machine or the like.

A further object is to provide a gauge of the foregoing type which is adapted to travel behind a cutting tool and measure the depth of the notch throughout its length.

A more specific object is to provide a gauge which has a spring-loaded anvil for riding over the surface of the workpiece, and a spring-loaded spade for riding within a notch as it is cut in the workpiece, whereby the double-spring arrangement enables the gauge to measure the actual depth of the notch from the surface despite irregularities in the surface.

In the drawing:

FIGURE 1 is a side elevational view with parts broken away of a milling machine equipped with my gauge;

FIGURE 2 is a vertical section of the gauge on a larger scale taken on line II—II of FIGURE 1; and FIGURE 3 is a side elevational view from the right of FIGURE 2.

FIGURE 1 shows a milling machine of a construction like that shown in my earlier application. The machine is installed on a pipe P and cuts a lengthwise notch N in the surface. FIGURE 2 shows the notch somewhat exaggerated in size for clarity. The machine includes a cross slide 10 and a power-driven, rotating cutting tool 12 supported on the underside of the slide. The slide and tool travel from right to left lengthwise of the pipe to cut the notch. I mount a gauge 13 constructed in accordance with the present invention on the slide 10 immediately behind the cutting tool 12 in alignment therewith.

As best shown in FIGURE 2, the gauge includes a plate 14 which is supported on the slide 10 and contains an eccentric bushing 15. The plate carries a hold-down clip 15a which engages bushing 15 to prevent unintended movement. I insert an outer ball bushing 16 within bushing 15 and a sleeve 17 within bushing 16. The sleeve carries a collar 18 rigidly fixed beneath the bushings. A compression spring 19 encircles the sleeve and bears at its ends against the bushing 16 and collar 18 and thus urges the sleeve downwardly relative to the bushing. The lower end of the sleeve forms a bifurcated anvil 20. The upper end of the sleeve carries a dial indicator 21 which has a depending relatively movable stem 22. The upper end of the sleeve bore has a counterbore 23 within which I insert an inner ball bushing 24 and a rod 25 within the bushing. The upper end of the rod has a head 26 which bears against the lower end of stem 22. A compression spring 27 encircles the stem and urges rod 25 downwardly. The intermediate portion of rod 25 carries a radial pin 28 which projects into a slot 29 in sleeve 17 to limit relative movement of the rod. The lower end of the rod carries a depending spade 30.

The two ball bushings 16 and 24 and the dial indicator 21 are commercially available components; hence I have not described them in detail. One example of a suitable outer bushing 16 is the type AG1014 produced by Thomson Industries, Inc., Manhasset, N.Y. One example of a suitable inner bushing 24 is the type Inst–258SS produced by the same company. One example of a suitable dial indicator 21 is the Universal Dial Test Indicator No. 196 manufactured by L. S. Starrett Company, Athol, Mass.

In operation, I rotatably adjust the eccentric bushing 15 and the outer ball bushing 16 to align the spade 30 accurately with the cutting tool 12. As the tool touches the pipe, I zero the dial indicator 21 to establish a reference. I operate the milling machine to cut a notch N, following the usual procedure. The tip of the anvil 20 rides along the surface of the pipe P on opposite sides of the notch. The spring 19 maintains the anvil in contact with the surface despite any irregularities in the surface. Thus the anvil 20 and sleeve 17 move up and down axially of the sleeve within the outer ball bushing 16 as the anvil encounters such irregularities. The tip of the spade 30 rides along the bottom of the notch N, and is maintained in contact therewith by the other spring 27. The stem 22 of the dial indicator moves up and down with axial movement of rod 25 relative to sleeve 17, whereby the reading on the indicator is an accurate indication of the distance from the surface to the bottom of the notch.

From the foregoing description it is seen that my invention affords a simple gauge for continuously and accurately measuring the depth of a notch cut in a workpiece. The measurement furnishes a true guide as to the depth of the notch from the surface of the workpiece despite any irregularities in the surface. It should be pointed out that the reading may be displayed at a location remote from the gauge by using suitable transmitting equipment.

While I have shown and described only a single embodiment of my invention, it is apparent that modifications may arise.

I claim:

1. A gauge for measuring the depth of a notch as it is cut in the surface of a workpiece, said gauge comprising a mounting plate, an eccentric bushing mounted in said plate, a ball bushing mounted in said eccentric bushing, an axially movable sleeve received in said ball bushing, an anvil at the end of said sleeve for engaging the workpiece, spring means urging said sleeve toward a position in which said anvil engages the workpiece, a rod housed within said sleeve and movable relatively thereto, a spade at the end of said rod for engaging the bottom of the notch, spring means urging said rod toward a position in which said spade engages the bottom of the notch, and a dial indicator mounted on said sleeve and engaged by said rod and being responsive to relative movement between the rod and sleeve for indicating the depth of the notch from the surface of the workpiece despite irregularities in the surface.

2. A gauge as defined in claim 1 including a second ball bushing within said sleeve receiving said rod, said rod having an enlarged head, said indicator means having a stem which engages said head, said second-named spring mean encircling said stem and engaging said head.

References Cited

UNITED STATES PATENTS

| | | |
|---|---|---|
| 2,599,835 | 6/1952 | Johnson et al. |
| 2,701,418 | 2/1955 | Steenburgh. |
| 2,975,524 | 3/1961 | Field. |
| 3,195,237 | 7/1965 | Aldeborgh. |

HARRY N. HAROIAN, Primary Examiner

U.S. Cl. X.R.

90—12